United States Patent
Solondz (12) 
(10) Patent No.: US 6,192,248 B1
(45) Date of Patent: *Feb. 20, 2001

(54) SERVICE CUSTOMIZATION IN A WIRELESS COMMUNICATION SYSTEM

(75) Inventor: Max A. Solondz, Madison, NJ (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/823,263

(22) Filed: Mar. 24, 1997

Related U.S. Application Data (63) Continuation-in-part of application No. 08/346,805, filed on Nov. 30, 1994, now Pat. No. 5,615,249.

(51) Int. Cl.[7] .................. H04Q 7/20; H04B 7/00

(52) U.S. Cl. .............. 455/450; 455/512; 455/509

(58) Field of Search .............. 455/450, 435, 455/436, 512, 434, 404, 521, 527, 509; 379/88.19, 88.2; 340/826

(56) References Cited

U.S. PATENT DOCUMENTS

| | | | |
|---|---|---|---|
| Re. 32,789 | | 11/1988 | Lynks, Jr. et al. ............ 379/58 |
| 4,012,597 | * | 3/1977 | Lynk, Jr. et al. ............ 455/512 |
| 4,757,529 | * | 7/1988 | Glapa et al. ............ 379/244 |
| 4,788,543 | * | 11/1988 | Rubin ............ 340/825.44 |
| 4,959,648 | * | 9/1990 | Breeden et al. ............ 340/825.44 |
| 5,025,254 | | 6/1991 | Hess ............ 379/62 |
| 5,226,071 | | 7/1993 | Bolliger et al. ............ 379/60 |
| 5,278,898 | * | 1/1994 | Cambray et al. ............ 379/266 |
| 5,301,333 | | 4/1994 | Bodin et al. ............ 455/33.2 |
| 5,329,578 | | 7/1994 | Brennan et al. ............ 379/67 |
| 5,349,632 | * | 9/1994 | Nagashima ............ 455/435 |
| 5,371,780 | * | 12/1994 | Amitay ............ 455/437 |
| 5,442,634 | * | 8/1995 | Cizek ............ 370/329 |
| 5,442,807 | * | 8/1995 | Takayama ............ 455/453 |
| 5,500,889 | * | 3/1996 | Baker et al. ............ 379/88.2 |
| 5,537,684 | * | 7/1996 | Cassidy et al. ............ 455/512 |
| 5,570,411 | * | 10/1996 | Sicher ............ 455/450 |
| 5,574,977 | * | 11/1996 | Joseph et al. ............ 455/450 |
| 5,625,680 | * | 4/1997 | Foladare et al. ............ 379/199 |
| 5,634,197 | * | 5/1997 | Paavonen ............ 455/512 |
| 5,666,364 | * | 9/1997 | Pierce et al. ............ 370/455 |
| 5,678,188 | * | 10/1997 | Hisamura ............ 455/509 |
| 5,740,533 | * | 4/1998 | Lin ............ 455/432 |

(List continued on next page.)

OTHER PUBLICATIONS

Motorola "System Saber", 1990, p. 4.

*Primary Examiner*—Reinhard J. Eisenzopf
*Assistant Examiner*—Charles N. Appiah (57) ABSTRACT

A system for customizing service in a wireless communication system in accordance with a user profile, unique to each user of the system, is described. In this system, a base station receives a call establishment request either via an external MTSO (mobile telephone switch office) or PSTN (public telephone switch network), or internally from a call establishment request, broadcasted by a wireless terminal associated with a first subscriber within a cell of interest. Both the base station and the wireless terminal are located in a cell (i.e., the cell of interest) of the wireless communication system. The base station determines whether it has a free channel, or resource, to service the call establishment request. If the base station does not have a free channel to service the call establishment request, then a call processor determines a service priority level contained in a user profile of the first subscriber. This service priority level is communicated to the base station. The base station processes the call establishment request in accordance with the service priority level of the first subscriber and service priority levels of second subscribers that are involved in telephone calls active in the cell.

17 Claims, 4 Drawing Sheets

U.S. PATENT DOCUMENTS

| | | | |
|---|---|---|---|
| 5,742,668 | * | 4/1998 | Pepe et al. ............................ 455/415 |
| 5,752,193 | * | 5/1998 | Scholefield .......................... 455/452 |
| 5,794,156 | * | 8/1998 | Alanara ............................... 455/517 |
| 5,812,656 | * | 9/1998 | Garland et al. ...................... 379/208 |
| 5,862,485 | * | 1/1999 | Linneweh, Jr. et al. ............. 455/450 |
| 6,067,457 | * | 5/2000 | Erickson et al. .................... 455/450 |
| 6,085,105 | * | 7/2000 | Becher ..................................... 455/5 |

* cited by examiner

SERVICE CUSTOMIZATION IN A WIRELESS COMMUNICATION SYSTEM

This Appln is a C-I-P of Ser. No. 08/346,805 filed Nov. 30, 1994, U.S. Pat. No. 5,615,249.

BACKGROUND OF THE INVENTION

1. Field of the Invention

The present invention relates generally to communication systems, and more particularly to a system and method of providing customized service in accordance with a user profile in wireless communication systems.

2. Description of Related Art

In conventional wireless communication systems, call establishment requests (which are issued to establish new telephone calls) are serviced on a first-come, first-served basis. Call establishment requests are not prioritized based on any customer-specific criteria (such as a customer's service plan or per-call choice). It is noted that some special types of calls, such as emergency "911" calls, are serviced on a priority basis. However, the priority service granted to such calls is not based on any customer-specific criteria.

As will be appreciated, wireless communication systems have a finite service capacity. New calls cannot be accepted if this service capacity is reached. Since call establishment requests are serviced on a first-come, first-served basis, callers will often be denied service simply because their call establishment requests were issued later in time than others. Clearly, the current methodology for processing call requests is arbitrary and inflexible.

Furthermore, conventional wireless communication systems contain no personal identification mechanism for associating individualized access privileges with a particular user making a call establishment request. As a result, conventional wireless communication systems are incapable of personalizing communication service in accordance with a particular user's access privileges.

Thus, what is required is an improved, flexible system and method for processing call establishment requests in a wireless communication system.

SUMMARY OF THE INVENTION

The present invention is directed to personalizing wireless communication service in a wireless communication system by associating a user profile with each user in the wireless communication system.

According to one aspect of the present invention, a wireless terminal transmits a call establishment request to a call establishment request handler. The wireless terminal contains a memory having stored therein a user profile containing a priority level associated with a particular user. The call establishment request handler processes the call establishment request in accordance with the priority and resources available in the wireless communication system. In an alternative embodiment of -the present invention, the wireless terminal contains a unique identification number associated with a particular user. The identification number is transmitted to the call establishment request handler. The call establishment request handler contains a user profile associated with the user profile. The call establishment request handler establishes the call in accordance with the priority level contained in the user profile.

Furthermore, the present invention maintains at least one resource to be available for establishing a call establishment request to service call establishment requests having a predetermined highest priority, for example, a call establishment request for emergency services.

The present invention can maintain more than one set of resources characterized by each set of resources being available to one or more groups of the prioritized users. These resources may be held in reserve so that certain users may not be able to access them.

Further aspects, features, and advantages of the present invention, as well as the structure and operation of various embodiments of the present invention, are described in detail below with reference to the accompanying drawings. In the drawings, like reference numbers indicate identical or functionally similar elements.

BRIEF DESCRIPTION OF THE FIGURES

The present invention will be described with reference to the accompanying drawings, wherein.

DETAILED DESCRIPTION OF THE PREFERRED EMBODIMENTS

The present invention is directed to a wireless communication system that supports the prioritization of telephone call requests in accordance with a unique user profile for a particular user of the system. The wireless communication system comprises wireless terminals with which users can make and receive call establishment requests. The user profile contains information unique to each individual system user. Such information includes a service priority level, a customized list of numbers for automatic dialing, and other information unique to a particular user. The service priority level is rate based (each subscriber elects which priority level he/she wishes to have). During times of peak demand, telephone call requests issued by subscribers are serviced in accordance with the subscribers' service priority levels. Subscribers having higher service priority levels are billed at higher rates than subscribers having lower service priority levels.

When wireless communication system network demand exceeds a wireless communication system's capacity, the present invention automatically determines which call requests to service based on the service priority level associated with the subscribers that issued the call establishment requests.

More particularly, the present invention is directed to a preferably software controlled call processor that prioritizes call traffic on a wireless communication network and provides billing information accordingly. Wireless call "taking" (establishing a call from either the public telephone network or a first wireless terminal to a second wireless terminal) and call "making" (establishing a call from a wireless terminal) are prioritized.

The present invention preferably supports the following service priority levels, although other service priority levels may alternatively be supported.

(1) Priority Service —For a special higher service fee (the most expensive rate), these customers receive priority calling service to make or receive calls despite excess demand in the cellular network.

(2) Premium Service —For the second most expensive service rate, these customers receive service where their calls are not dropped to serve Priority Service Customers.

(3) Normal Service —For the regular service rate (third most expensive rate), these customers receive service with a normal priority. However, Normal Service customers receive a lower priority in establishing a call.

(4) Basic Service —For a reduced service rate (the fourth highest rate), customers receive service with a low priority.

(5) Economy Service —For an even lower service rate (the most inexpensive rate), customers receive service with a lowest priority.

Call establishment requests having a higher priority are more likely to be established than calls establishment requests having a lower priority. Therefore, calls establishment requests having a having a higher priority are more likely to be given access to resources in the wireless communication system of the present invention.

For example, a set of reserve resources can include reserve class A, reserve class B, reserve class C and reserve class D. The Priority Service customers could have access to the reserve resources from the reserve class A. Similarly, the Priority Service and Premium Service customers could have access to the reserve resources from the reserve class B. The Priority Service, Premium Service and Normal Service customers could have access to the reserve resources from the reserve class C. Finally, the Priority Service, Premium Service, Normal Service and Basic customers could have access to the reserve resources from the reserve class D. The Economy Service customers do not obtain access to the reserve resources. In this manner, the higher service customers obtain access to additional reserved resources so that the wireless communication network can handle system capacity conditions gracefully. Further, certain reserved resources are only available to the highest service customers (e.g., reserve class A).

Figure 1:
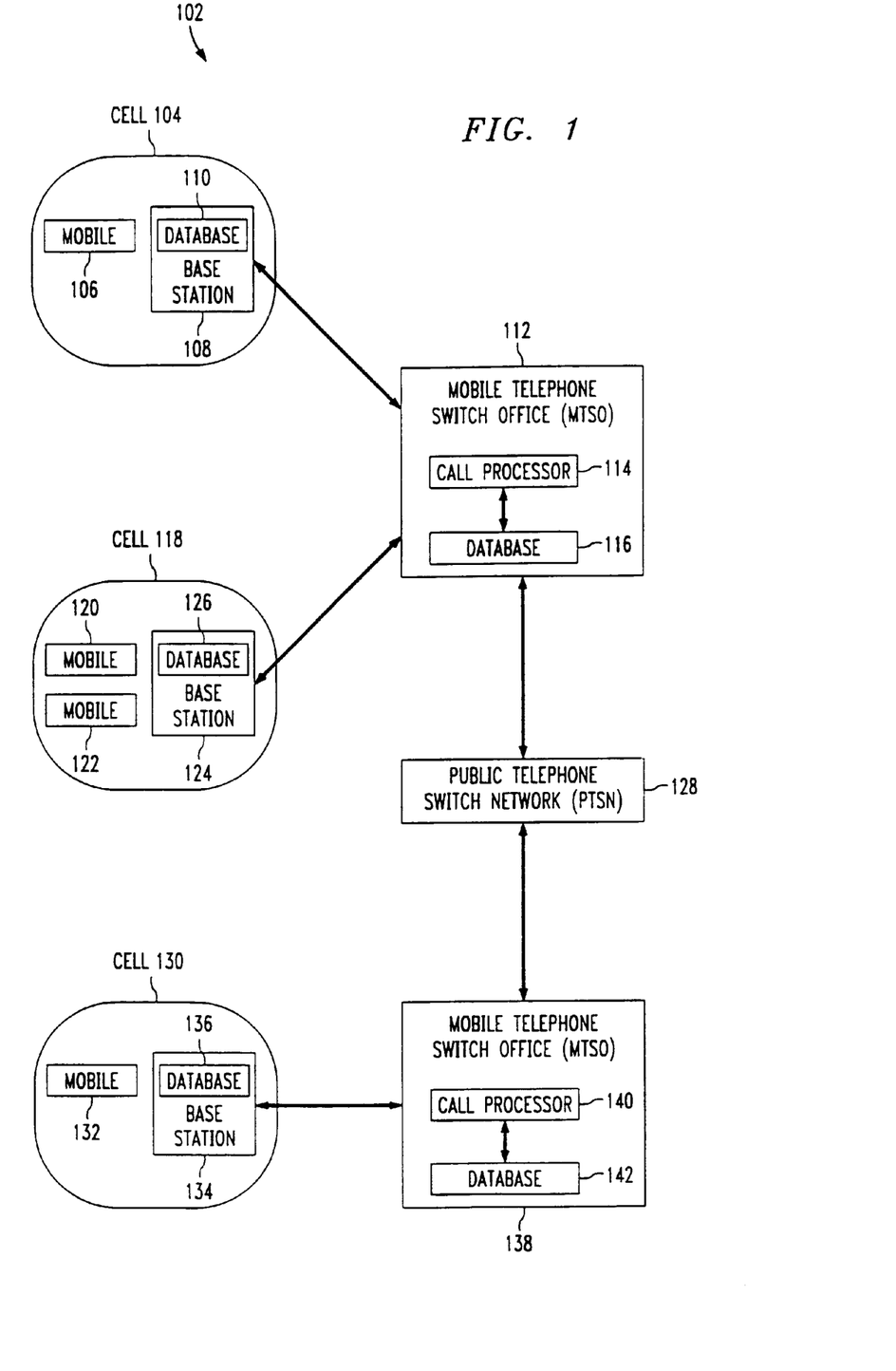
FIG. 1 is a block diagram of a telephone system according to a preferred embodiment of the present invention.

FIG. 1 is a block diagram of a wireless communication system 102 according to a preferred embodiment of the present invention. The telephone communication system 102 includes a public telephone switch network (PTSN) 128 and a plurality of wireless communication system cells 104, 118, 130. At any time, zero or more wireless terminals 106, 120, 122, 132 may be located in the cells 104, 118, 130, such as wireless terminal 106 which is located in cell 104. A wireless terminal 106 includes a memory to store a user profile containing information, such as service priority level, unique to a particular user. Though the information, such as service priority level, is unique to a particular user, more than one user may have the same information. For example, more than one user may have a normal service priority level. The wireless terminal 106 may also include a receiver to receive a user profile from a database of user profiles, from a user profile memory card or other input device. The database of user profiles may be stored in the base station 106 or in the mobile telephone switch office 112. Additionally, a user profile may be included as part of the initial configuration of a wireless terminal upon sale to a customer.

In an alternative preferred embodiment of the present invention, the wireless terminal 106 contains a memory to store a unique user identification number for a particular user. The wireless terminal 106 transmits the user identification number to a base station 108 (described later). The base station 108 determines a user profile to associate with the unique user identification number that was transmitted to it. The unique user identification number may be hardwired into the wireless terminal 106 at the point of sale. The unique user identification number may be input by some other input device. For example, the wireless terminal 106 may include a memory card or may allow the user to enter the unique user identification number through keypad entry such as a touch-tone telephone's keypad. It would be apparent to one of ordinary skill in the art that other input methods may be used to enter a user identification number into a wireless terminal 106 and that the foregoing list is for example only and not limiting of the present invention.

Each cell 104, 118, 130 includes a base station, such as base station 108 in cell 104. Each base station, such as base station 108, includes a database 110. This database 110 includes a list (or table) having an entry for each of the telephone calls which are currently active in the cell 104. The entries store information that identifies the service levels (also called level-of-services) respectively associated with the wireless terminals in the cell 104 that are involved in the active telephone calls. The base station 108 may also include a database of user profiles. The user profiles are associated with particular users via unique user identification numbers assigned to each user.

The cells 104, 118, 130 are connected to the PTSN 128 via mobile telephone switch offices (MTSO) 112, 138. One or more cells 104, 118, 130 may be associated with each of the MTSOs 112, 138. According to the present invention, each MTSO 112, 138 includes a call processor and a database, such as call processor 114 and database 116 in MTSO 112. Preferably, the call processor 114 is a processor operating in accordance with control logic, such as computer software. Alteratively, the call processor 114 is a primarily hardware state machine.

The database 116 includes a list or table that includes an entry for each wireless terminal 106, 120, 122 contained in the cells 104, 118 with which it is associated. The entries store information that identifies the service levels (also called service priority levels and level-of-services) for these wireless terminals 106, 120, 122.

The general structure and operation of the wireless terminals 106, 120, 122, 132, the base stations 108, 124, 134, the MTSOs 112, 138, and the PTSN 128 are well known. Accordingly, the description presented herein focuses on the features of these units which support the prioritization of telephone call requests according to the present invention.

Figure 2:
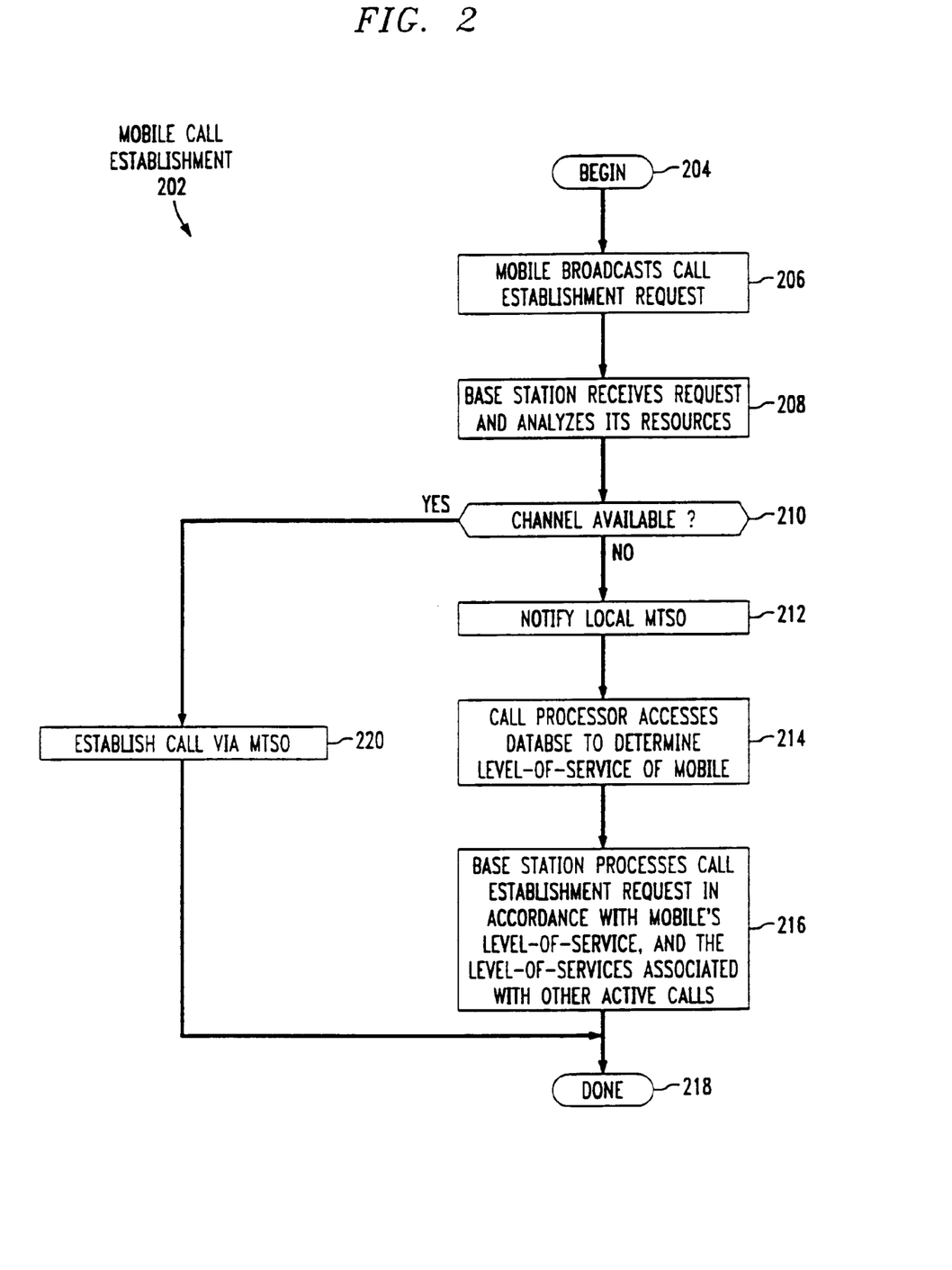
FIGS. 2–4 are flowcharts representing the preferred operation of the present invention.

FIG. 2 is a flowchart 202 depicting the manner in which a wireless terminal establishes a telephone call to a public network subscriber according to a preferred embodiment of the present invention. For illustrative purposes, flowchart 202 is described with respect to wireless terminal 106 located in cell 104. Flowchart 202 begins with step 204, where control immediately passes to step 206.

In step 206, the wireless terminal 106 broadcasts a call establishment request to establish a call with a particular public network subscriber. A wireless terminal contains a transmitter to transmit a call establishment request, initiated by a user, to a destination unit.

In step 208, the base station 108 located in cell 104 receives this call establishment request. As will be appreciated to one of ordinary skill in the art, each base station 108 has a finite number of channels, or resources, over which telephone calls may be established. Generally, one telephone call may be established for each channel. In step 208, the base station 108 analyzes its resources to determine whether it has a free channel to service the call establishment request.

As indicated by decision step 210, if the base station 108 has a free channel to service the call establishment request, then step 220 is performed. In step 220, a call is established between the wireless terminal 106 and the public network subscriber in a well known manner. Operation of the flowchart 202 is complete after step 220 is performed, as indicated by step 218.

If the base station 108 does not have a free channel to service the call establishment request, then step 212 is performed. In step 212, the base station 108 notifies its MTSO 112 that it does not have sufficient capacity to service the call establishment request.

In step 214, the call processor 114 in the MTSO 112 accesses the database 116 to determine the service priority level of the call establishment request transmitted by wireless terminal 106. The call processor 114 transmits this information to the base station 108.

In step 216, the base station 108 processes the call establishment request in accordance with the wireless terminal 106's service priority level, and the service priority levels associated with all active calls in the cell 104. An allocator allocates channels to call establishment requests in accordance with the service priority levels described above. The wireless communication system of the present invention may reserve channels for higher priority users. And, as will be described later, the wireless communication system of the present invention reserves one or more channels to establish call establishment requests having a predetermined highest priority level, for example, emergency calls. The allocator may be located in a wireless terminal 106, a base station 108, or an MTSO 112.

If the call is established, then a message to this effect is sent to the MTSO 112 so that the MTSO 112 can update its billing records.

If, instead, the service priority level of the wireless terminal 106 is "Normal Service," "Basic Service," or "Economy Service," then the base station 108 does not service the call establishment request. In this case, a message is sent back to the wireless terminal 106 notifying the wireless terminal 106 that service capacity has been reached, and that the call establishment request could not be serviced.

Operation of the flowchart 202 is complete after step 216 is performed, as indicated by step 218.

Figure 3:
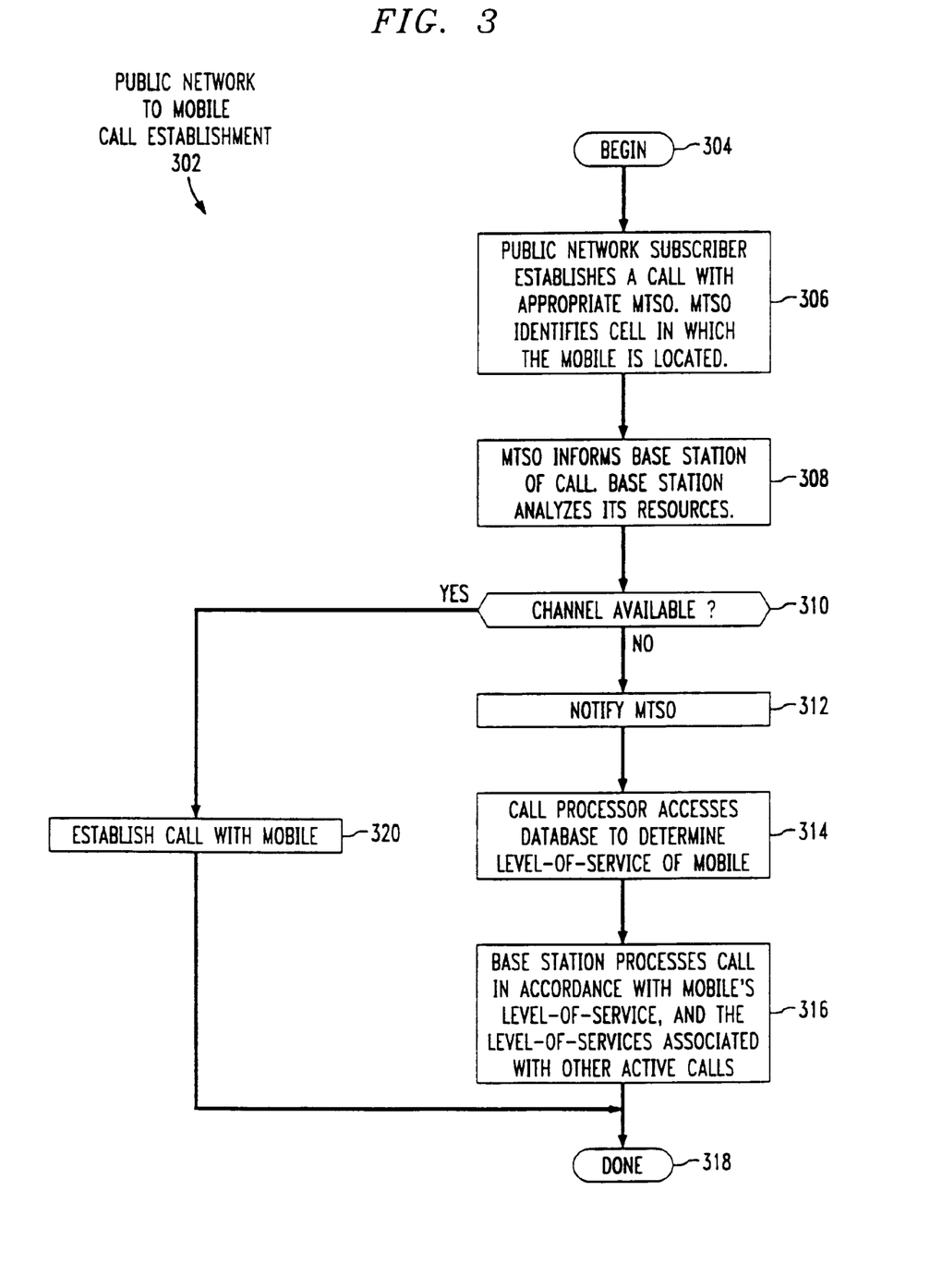

FIG. 3 is a flowchart 302 depicting the manner in which a public network subscriber establishes a telephone call with a wireless terminal according to a preferred embodiment of the present invention. For illustrative purposes, flowchart 302 is described with respect to wireless terminal 106 located in cell 104. Flowchart 302 begins with step 304, where control immediately passes to step 306.

In step 306, the public network subscriber establishes a call with the appropriate MTSO in a well known manner. The "appropriate MTSO" is the MTSO which is associated with the cell in which the wireless terminal 106 is contained, which in this case is the MTSO 112. Also in step 306, the MTSO 112 identifies in a well known manner the cell (in this case, cell 104) in which the wireless terminal 106 is contained.

In step 308, the MTSO 112 identifies the base station 108 of the call. The base station 108 analyzes its resources to determine whether it has a free channel, or resource, to service the call.

As indicated by decision step 310, if the base station 108 has a free channel to service the call, then step 320 is performed. In step 320, the call is serviced using a free channel in a well known manner. Operation of the flowchart 302 is complete after step 320 is performed, as indicated by step 318.

If the base station 108 does not have a free channel to service the call, then step 312 is performed. In step 312, the base station 108 notifies its MTSO 112 that it does not have sufficient capacity to service the call.

In step 314, the call processor 114 in the MTSO 112 accesses the database 116 to determine the service priority level of the wireless terminal 106. The call processor 114 transmits this information to the base station 108.

In step 316, the base station 108 conditionally processes the call in accordance with the wireless terminal 106's service priority level, and the service priority levels associated with all active calls in the cell 104. The operation of step 316 is similar to step 216 in FIG. 2, described above. If the service priority levels of the wireless terminal 106 and the subscribers associated with the active calls in the cell 104 are such that the call involving the wireless terminal 106 cannot be serviced, then a message reporting this is sent back to the public network subscriber. If, instead, the call is established, then a message to this effect is sent to the MTSO 112 so that the MTSO 112 can update its billing records. Operation of the flowchart 302 is complete after step 316 is performed, as indicated by step 318.

Figure 4:
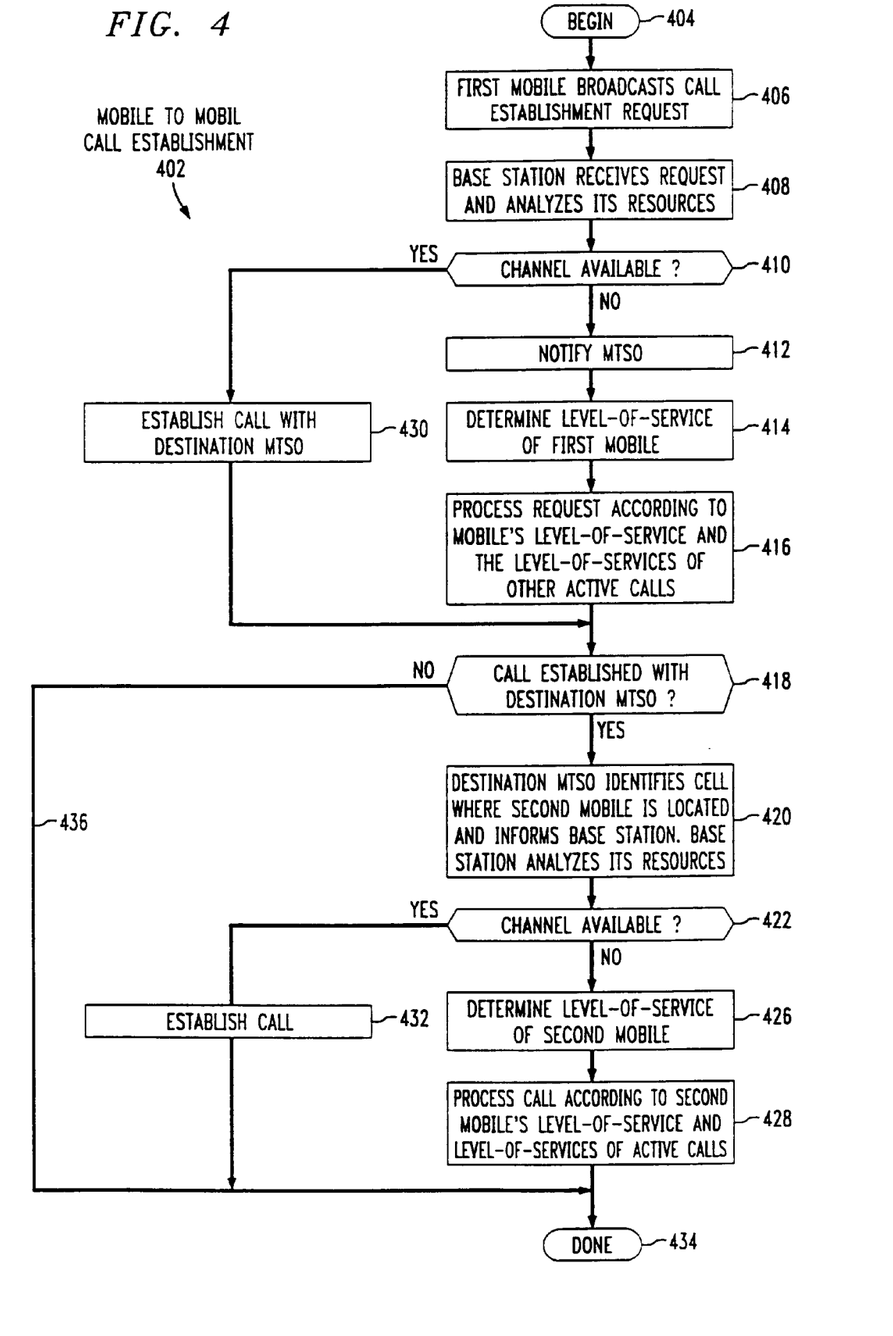

FIG. 4 is a flowchart 402 depicting the manner in which a wireless terminal establishes a telephone call to another wireless terminal according to a preferred embodiment of the present invention (in this case where the call involves two wireless terminals, the service fees charged to each wireless terminal is based on their respective priority service levels). For illustrative purposes, flowchart 402 is described with respect to wireless terminal 106 located in cell 104 and wireless terminal 120 in cell 118. Flowchart 402 begins with step 404, where control immediately passes to step 406.

In step 406, the wireless terminal 106 broadcasts a call establishment request to establish a call with the wireless terminal 120.

In step 408, the base station 108 located in cell 104 receives this call establishment request. The base station 108 analyzes its resources to determine whether it has a free channel to service the call establishment request.

As indicated by decision step 410, if the base station 108 has a free channel to service the call establishment request, then step 430 is performed. In step 430, a call is established between the wireless terminal 106 and the destination MTSO using a free channel associated with the base station 108. The destination MTSO is the MTSO associated with the cell (i.e., cell 118) in which the destination wireless terminal (i.e., wireless terminal 120) is located.

If the base station 108 does not have a free channel to service the call establishment request, then step 412 is performed. In step 412, the base station 108 notifies its MTSO 112 that it does not have sufficient capacity to service the call establishment request.

In step 414, the call processor 114 in the MTSO 112 accesses the database 116 to determine the service priority level of the wireless terminal 106. The call processor 114 transmits this information to the base station 108.

In step 416, the base station 108 processes the call establishment request in accordance with the wireless terminal 106's service priority level, and the service priority levels associated with all active calls in the cell 104. The operation of step 416 is similar to step 216 in FIG. 2, described above. If the service priority levels of the wireless terminal 106 and the subscribers associated with the active calls in the cell 104 are such that the call involving the wireless terminal 106 cannot be serviced, then a message is sent back to the wireless terminal 106 notifying the wireless terminal 106 that service capacity has been reached, and that the call establishment request could not be serviced.

Processing to establish a call between wireless terminals 106 and 120 continues if a call was established between the wireless terminal 106 and the destination MTSO 112 in either steps 430 or 416. This is indicated by decision step 418. If a call was established between the wireless terminal 106 and the destination MTSO 112 in either steps 430 or 416, then step 420 is performed. If a call was not established, then operation of flowchart 402 is complete, as indicated by step 434 (path 436).

In step 420, the destination MTSO 112 identifies in a well known manner the cell (in this case, cell 118) in which the destination wireless terminal 120 is contained. The MTSO 112 identifies the base station 124 in cell 118 of the call. The base station 124 analyzes its resources to determine whether it has a free channel to service the call.

As indicated by decision step 422, if the base station 124 has a free channel to service the call, then step 432 is performed. In step 432, the call is serviced using a free channel in a well known manner. Operation of the flowchart 402 is complete after step 432 is performed, as indicated by step 434.

If the base station 124 does not have a free channel to service the call, then step 426 is performed. In step 426, the base station 124 notifies its MTSO 112 that it does not have sufficient capacity to service the call. The call processor 114 in the MTSO 112 accesses the database 116 to determine the service priority level of the destination wireless terminal 120. The call processor 114 transmits this information to the base station 124.

In step 428, the base station 124 conditionally processes the call in accordance with the wireless terminal 120's service priority level, and the service priority levels associated with all active calls in the cell 118. The operation of step 428 is similar to step 216 in FIG. 2, described above (except in this case, the analysis is conducted with respect to the wireless terminal 120's service priority level, and the service priority levels associated with all active calls in the cell 118). If the service priority levels of the wireless terminal 120 and the subscribers associated with the active calls in the cell 118 are such that the call involving the wireless terminal 120 cannot be serviced, then a message reporting this is sent back to the MTSO 112 and the wireless terminal 106 in the cell 104. If, instead, the call is established, then a message to this effect is sent to the MTSO 112 so that the MTSO 112 can update its billing records. Operation of the flowchart 402 is complete after step 428 is performed, as indicated by step 434.

Thus, as is clear from the above, whether or not a call between two wireless terminals will be established depends on the priority service levels associated with each wireless terminal, and the priority service levels associated with subscribers involved in telephone calls active in the cells in which the two wireless terminals are contained. Generally, the overall priority of the two wireless terminals is limited by the lowest priority of the two. For example, if one wireless terminal has a priority of Premium, and the other has a priority of Economy, then with all else being equal, whether or not the call will be established will be governed by the Economy level (of course, the priority service levels associated with subscribers involved in telephone calls active in the cells in which the two wireless terminals are contained must be considered).

In order to allow customers the ability to vary their access capability and the cost of their calls, as users they can enter special control sequences (for example, by using the asterisk and the pound keys) to upgrade or downgrade their priority level for a special "per-use" fee that applies to that one telephone call. This higher "per-use" fee allows Basic or Economy customers the ability to gain higher priority access to the wireless communication system during peak demand times.

Other Service Priority Levels

As discussed above, the present invention preferably supports five service priority levels: Priority Service, Premium Service, Normal Service, Basic Service, and Economy Service. However, the present invention is intended and adapted to support other priority levels (either in addition to or instead of the five priority levels just listed). In one embodiment, the present invention supports a sixth priority level in addition to the above. This sixth priority level is called "Emergency Service," and it is the highest priority level (i.e., higher than Priority Service). The Emergency Service priority level is designated for federal, state, and/or local emergency services personnel or critical government functions. These designated customers receive the highest priority service to make or receive calls despite excess demand in the cellular network. If lower priority customer calls (Basic or Economy) occupy the facilities, these lower priority calls can be automatically dropped to serve the Emergency Service customers. Also, during times designated by the cellular service provider as an "emergency condition," such as a weather or natural catastrophe, or a civil emergency, these Emergency Customers preempt calls of any of the lower priority customers (Priority, Premium, Normal, Basic, or Economy).

Benefits of the Present Invention

Because the capacity of wireless communication system networks is fixed, access to placing or receiving a telephone call is a scarce resource that cannot always be expanded in a cost effective manner. Prioritization allows a service fee based allocation method to service the demand. Many customers are willing to pay higher subscription rates for "guaranteed" cellular service, which could be provided only by a prioritized network. It is possible that more customers would subscribe for service if rates were lower, but without prioritization, the network might not be able to handle the increased traffic demand without unacceptable call blocking rates.

Prioritization would also allow government designated emergency services (such as police, fire, or ambulance) or critical government agencies (such as security) prioritized access to make and take calls in the cellular network. This is the Emergency Service level discussed above. During natural catastrophes or public emergencies, when telephone networks are capacity stressed the most, the cellular service provider can establish a "designated emergency" to allow these governmental agencies prioritized service over all other classes of service. Under normal service conditions, these users only displace the lower classes of service (Basic and Economy).

The division of subscribers into service levels according to the present invention allows a cellular service provider to purposely "over-subscribe" the network. (i.e., put more paying customers onto it than it could normally handle during peak demand) while still providing low blocking rates to the higher priority customers. The lower priority customers receive cellular service at a lower fee than would be possible if the network were engineered to handle the peak calling demand for the entire subscriber base.

In different wireless communication system markets there are different expectations about the level of service. Prioritization according to the present invention makes it possible to meet these conflicting expectations and restraints at the same time. In some cellular markets, low access price is of paramount important or is mandated by governmental authority. For these cellular providers, the ability to purposely oversubscribe the network lowers the installation costs, while prioritization still allows customers willing to pay a higher price access to a virtual network with a lower blocking rate. In other markets, the added convenience of very low blocking rates justifies demanding a higher fee for an improved level of service, allowing the service provider to differentiate the offered product line.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. An apparatus, comprising:
   a transmitter to transmit a call establishment request initiated from an originating unit;
   a first memory for storing a first user profile, said first user profile uniquely associated with said originating unit, and said first user profile comprising a first priority level;
   a second memory for storing a second user profile, said second user profile uniquely associated with a destination unit. and said second user profile comprising a second priority level; and
   call establishment means to process said call establishment request when a predetermined resource is not available so as to establish a call between said originating unit and said destination unit according to said first priority level said second priority level and resources determined to be available.

2. The apparatus of claim 1, further comprising a receiver to receive said user profile from a database stored on a user profile storage device.

3. The apparatus of claim 1, in which said destination unit is capable of returning a second priority level to said apparatus, and wherein a call establishment request handler maintains at least one available resource for processing a call establishment request using said at least one available resource if said destination unit returns a second priority level equivalent to a predetermined highest priority level.

4. The apparatus of claim 1, wherein said call establishment request has a second priority level, and wherein a call establishment request handler maintains at least one available resource for processing said call establishment request if said second priority level is equivalent to a predetermined highest priority level.

5. The apparatus of claim 1, further comprising an allocator for allocating resources available for establishing call requests according to said priority level.

6. The apparatus of claim 5, further comprising:
   determining means for determining whether said call establishment request has a second priority level equal to a predetermined highest priority level, wherein said allocator maintains at least one available resource for processing a call establishment request using said at least one available resource when said determining means determines that said call establishment request has a priority level equal to said predetermined highest priority level.

7. An apparatus, comprising:
   a receiver to receive a call establishment request;
   a database having stored therein a representation of available resources for establishing calls; and
   an allocator for allocating available resources when a predetermined resource is not available to conditionally establish a call between an originating unit and a destination unit in accordance with said call establishment request based on a first priority level and a second priority level of said call establishment request stored in a first memory and a second memory respectively, said first priority level being associated with said originating unit and said second priority level being associated with said destination unit.

8. The apparatus of claim 7, further comprising:
   a second database having stored therein a user profile, said user profile unique to a particular user, and said user profile comprising a priority level associated with said particular user.

9. The apparatus of claim 8, further comprising:
   a transmitter to transmit said user profile from said second database to a call establishment requester.

10. The apparatus of claim 7, wherein said call establishment request contains priority level information which is extracted by said allocator.

11. The apparatus of claim 8, wherein said allocator extracts priority level information from said user profile.

12. The apparatus of claim 7, wherein said allocator maintains at least one resource available for establishing a call based on a call establishment request where said call establishment request has a priority level equivalent to a predetermined highest priority level.

13. An apparatus, comprising:
   a first memory for storing a user identification number, said user identification number uniquely associated with a user;
   a transmitter to transmit a call establishment request, initiated by said user at an originating unit, having a first user profile uniquely associated with said user identification number, wherein said user profile contains a first priority level;
   a second memory for storing a second user profile remote from said first memory, said second user profile uniquely associated with a destination unit, and said second user profile comprising a second priority level; and
   call establishment means to process said call establishment request when a predetermined resource is not available so as to establish a call between said originating unit and said destination unit according to said first priority level, said second priority level and resources determined to be available.

14. A method comprising the steps of:
   (1) assigning a unique user profile to each user of a call establishment apparatus at an originating unit, each unique user profile including a priority level;
   (2) determining a priority level of an originating unit associated with said call establishment apparatus stored in a first memory and a second priority level of a destination unit associated with said call establishment apparatus stored in a second memory remote from said first memory;
   (3) modifying characteristics of said call establishment apparatus in accordance with a first user profile assigned to said originating unit and a second user profile assigned to said destination unit; and
   (4) establishing a call between the originating unit and the destination unit when a predetermined resource is not available based on the modified characteristics.

15. The method of claim 14, wherein step (1) comprises the steps of:
   receiving a user profile from a database stored on a user profile storage device; and storing said user profile in a memory contained in said call establishment apparatus.

16. A method comprising:

(1) receiving a call establishment request having a first priority level associated with an originating unit stored in a first memory and a second priority level associated with a destination unit stored in a second memory remote from said first memory;

(2) when a predetermined resource is not available, determining if there is a resource available to establish a call between said originating unit and said destination unit in accordance with said call establishment request based on said first priority level and said second priority level; and (3) establishing a call in accordance with said call establishment request if it is determined that there is a resource available to establish said call establishment request based on said first priority level and second priority level.

17. The method of claim 16, wherein step (2) comprises the step of:

assuring the availability of at least one resource to establish a call request having a priority level equivalent to a predetermined highest priority level.

* * * * *